(12) United States Patent
Kim

(10) Patent No.: US 9,050,962 B2
(45) Date of Patent: Jun. 9, 2015

(54) MOUNTING STRUCTURE FOR BOOSTERS AND BOOSTER ASSEMBLY FOR VEHICLES HAVING THE SAME

(75) Inventor: Tae Hwan Kim, Gyeonggi-do (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 469 days.

(21) Appl. No.: 13/531,259

(22) Filed: Jun. 22, 2012

(65) Prior Publication Data

US 2012/0324881 A1     Dec. 27, 2012

(30) Foreign Application Priority Data

Jun. 23, 2011  (KR) .................. 10-2011-0060929

(51) Int. Cl.
*B60T 13/565*     (2006.01)
*B60T 13/567*     (2006.01)

(52) U.S. Cl.
CPC ............. *B60T 13/565* (2013.01); *B60T 13/567* (2013.01)

(58) Field of Classification Search
CPC .............................. B60T 13/565; B60T 13/567
USPC ............................. 60/547.1; 92/169.2, 169.3
See application file for complete search history.

(56) References Cited

U.S. PATENT DOCUMENTS

| | | | |
|---|---|---|---|
| 5,487,327 A * | 1/1996 | Schluter et al. ................ | 92/128 |
| 6,314,865 B1 * | 11/2001 | Henein et al. ................ | 92/169.3 |
| 6,561,077 B2 * | 5/2003 | Castel et al. ................ | 92/169.3 |
| 6,651,548 B1 * | 11/2003 | Faller ............................ | 92/169.2 |
| 6,918,249 B2 | 7/2005 | Maligne et al. | |
| 7,096,775 B2 * | 8/2006 | Endo et al. ................... | 92/169.3 |
| 7,331,275 B2 * | 2/2008 | Sexton et al. ................ | 92/169.3 |

FOREIGN PATENT DOCUMENTS

| | | |
|---|---|---|
| CN | 201371807 Y | 12/2009 |
| KR | 6-69045 U | 9/1994 |
| KR | 2009-0079356 A | 7/2009 |

OTHER PUBLICATIONS

Chinese Office Action issued in Chinese Application No. 201210212209.5 dated May 5, 2014.
Korean Office Action issued in Korean Patent Application No. 10-2011-0060929 dated Aug. 7, 2012.

* cited by examiner

*Primary Examiner* — Thomas E Lazo
(74) *Attorney, Agent, or Firm* — McDermott Will & Emery LLP

(57) ABSTRACT

Disclosed herein are a mounting structure for boosters and a booster assembly for vehicles having the same. The mounting structure for boosters to mount a booster provided with a casing formed by hermetically connecting a front cell and a rear cell includes a front bolt passing through the front cell, the inside of the front bolt being hollow, a tube having a cylindrical shape, the inside of which is hollow in the lengthwise direction, and provided with a front part being opposite the front bolt to communicate with the hollow of the front bolt and a rear part crossing the casing to pass through the rear cell, a support washer installed on the tube and connected to the rear portion of the front bolt to surround the outer circumferential surface of the rear portion of the front bolt, and a sealing member provided between the tube and the support washer.

6 Claims, 5 Drawing Sheets

MOUNTING STRUCTURE FOR BOOSTERS AND BOOSTER ASSEMBLY FOR VEHICLES HAVING THE SAME

CROSS-REFERENCE TO RELATED APPLICATION

This application claims the benefit of Korean Patent Application No. 2011-0060929, filed on Jun. 23, 2011 in the Korean Intellectual Property Office, the disclosure of which is incorporated herein by reference.

BACKGROUND

1. Field

Embodiments of the present invention relate to a mounting structure for boosters which allows a booster and a master cylinder to be easily installed in a vehicle and a booster assembly for vehicles having the same.

2. Description of the Related Art

In general, a booster assembly for vehicles is a device generating high hydraulic pressure at small force using a pressure difference between suction pressure of a vehicle engine and atmospheric pressure, and includes a booster 10 generating large force at small force and a master cylinder 20 converting the force generated from the booster 10 into hydraulic pressure, as shown in FIG. 1.

When the booster 10 and the master cylinder 20 are installed in a vehicle, the booster 10 and the master cylinder 20 are generally mounted on a dashboard 1 dividing an engine room and a driver's seat of the vehicle from each other. As shown in FIG. 1, the booster 10 and the master cylinder 20 are located in the engine room, and an input shaft 13 of the booster 10 operating in connection with a brake pedal 2 passes through the dashboard 1, enters the driver's seat and is connected to the brake pedal 2.

Such a booster assembly may be easily installed by connecting a through bolt 33 passing through the dashboard 1 in a direction from the engine room to the driver's seat to a nut 4 fixed in advance to the pedal bracket 3. Hereinafter, a connection structure between the booster 10 and the master cylinder 20 via the through bolt 33 will be described with reference to FIG. 2.

Installation of the booster 10 and the master cylinder 20 using the through bolt 33 is to solve inconvenience of fastening a rear bolt (not shown) passing through the dashboard 1 to the driver's seat by a nut if the booster 10 is conventionally mounted on the dashboard 1.

A hollow tube 31 is provided within the booster 10, and a front bolt 32 to mount the master cylinder 20 and to support the tube 31 is caulked with a front cell 11 and is connected to the front portion of the tube 31. The rear portion of the tube 31 passes through a rear cell 12.

The master cylinder 20 is provided with a flange part 22 extending outwardly, and is fixed to the booster 10 by inserting the front bolt 32 into the flange part 22 and screw-connecting a nut 34 to the front bolt 32.

The through bolt 33 passes through the front bolt 32, the tube 31 and the dashboard 1, and is connected to the nut 4 (with reference to FIG. 1) fixed to the pedal bracket 3.

The tube 31 is inserted into the inner diameter of the front bolt 32 to maintain airtightness with the booster 10, and is caulked so as to be firmly fixed through a ring-shaped member 35. Here, a structure of caulking the tube 31 to the front bolt 32 using the ring-shaped member 35 is disclosed in U.S. Pat. No. 5,487,327.

As described above, the booster 10 and the master cylinder 20 are assembled using the through bolt 33, and thus ease of assembly may be obtained. However, in the structure of fixing the tube 31 to the front bolt 32, the tube 31 and the front bolt 32 are caulked with the separate ring-shaped member 35, and thus operation is difficult and a process needs to be added in case of in-house manufacturing.

Further, the tube 31 needs to be installed on the front cell 11 in case of outsourcing manufacturing, and the tube 31 increases the volume of the front cell 11, thereby increasing logistics and transportation costs.

SUMMARY

Therefore, it is an aspect of the present invention to provide a mounting structure for boosters which shortens an assembly time when a booster for vehicles is installed on a vehicle body frame, and a booster assembly for vehicles having the same.

Additional aspects of the invention will be set forth in part in the description which follows and, in part, will be obvious from the description, or may be learned by practice of the invention.

In accordance with one aspect of the present invention, a mounting structure for boosters to mount a booster provided with a casing formed by hermetically connecting a front cell and a rear cell includes a front bolt passing through the front cell, the inside of the front bolt being hollow, a tube having a cylindrical shape, the inside of which is hollow in the lengthwise direction, and provided with a front part being opposite the front bolt to communicate with the hollow of the front bolt and a rear part crossing the casing to pass through the rear cell, a support washer installed on the tube and connected to the rear portion of the front bolt to surround the outer circumferential surface of the rear portion of the front bolt, and a sealing member provided between the tube and the support washer.

The front bolt may include a first connection part protruding to the outside of the front cell, a second connection part protruding to the inside of the front cell, and an extension part integrally formed between the first connection part and the second connection part and expanding in the radial direction to be caulked to the front cell.

The tube may include stepped parts having a smaller outer diameter than that of the tube and formed at both parts of the tube, and the support washer may include a rear support part inserted into the stepped part, and a front support part extending from the rear support part and connected to the second connection part to surround the second connection part.

In accordance with another aspect of the present invention, a mounting structure for boosters to mount a booster provided with a casing formed by hermetically connecting a front cell and a rear cell includes a front bolt passing through the front cell, the inside of the front bolt being hollow, a tube having a cylindrical shape, the inside of which is hollow in the lengthwise direction, and provided with a front part connected to the rear portion of the front bolt to surround the outer circumferential surface of the rear portion of the front bolt and a rear part crossing the casing to pass through the rear cell, and a sealing member provided between the tube and the front bolt.

The front bolt may include a first connection part protruding to the outside of the front cell, a second connection part protruding to the inside of the front cell, and an extension part integrally formed between the first connection part and the second connection part and expanding in the radial direction to be caulked to the front cell.

A groove line into which the sealing member is inserted may be formed on the outer circumferential surface of the second connection part.

The tube may be provided with an expansion part expanding so as to have a larger inner diameter than that of the tube, and the expansion part may be connected to the second connection part so as to surround the second connection part.

In accordance with a further aspect of the present invention, a booster assembly for vehicles includes a booster provided within an engine room divided from a driver's seat by a dashboard, a master cylinder located at the outside of the front portion of the booster and converting force generated from the booster into hydraulic pressure, a pedal bracket connected to the dashboard at the side of the driver's seat and provided with a fixing nut formed integrally with the pedal bracket, a through bolt passing through the master cylinder and the booster from the engine room and fastened to the fixing nut of the pedal bracket, and a mounting structure for boosters crossing the booster such that the through bolt is inserted into the mounting structure for boosters having the above-described configuration.

A flange part through which the front bolt provided on the mounting structure for boosters passes may be formed on the master cylinder, and the booster assembly for vehicles may further include a nut screw-connected to the front bolt passing through the flange part to fix the master cylinder to the booster.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
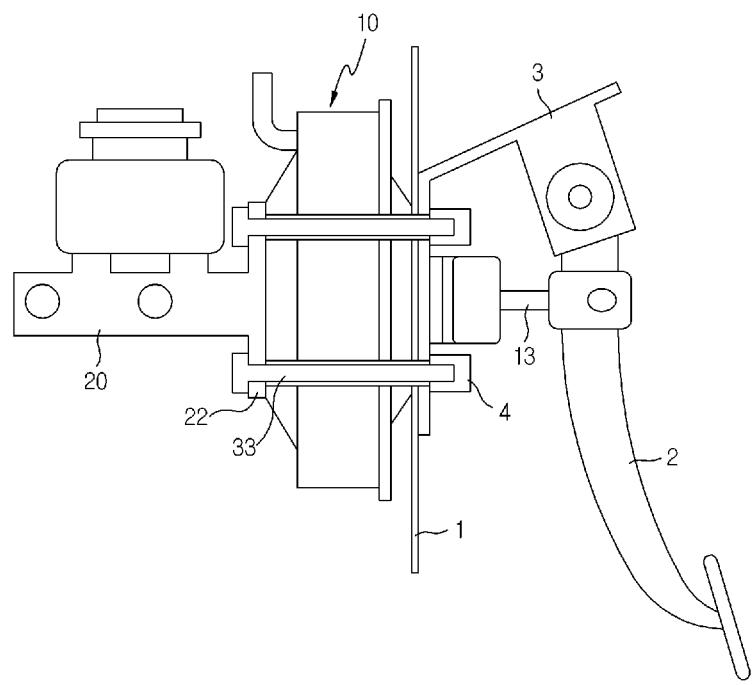
FIG. 1 is a view schematically illustrating a conventional booster assembly.
Figure 2:
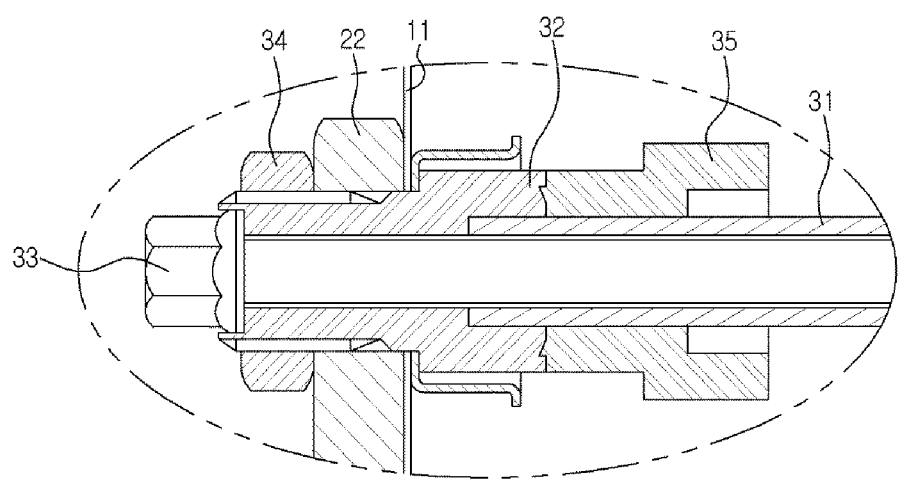
FIG. 2 is a partially detailed view illustrating a state in which a booster and a master cylinder are conventionally installed in a vehicle.

Reference will now be made in detail to the embodiments of the present invention, examples of which are illustrated in the accompanying drawings, wherein like reference numerals refer to like elements throughout. Prior to description, the terms or words used in the disclosure and the claims are not interpreted as having general meanings or dictionary meanings, but should be interpreted as having meanings and concepts coinciding with the technical scope and sprit of the present invention based on the principle in that an inventor may properly define the concept of terms to describe the present invention in the best mode. Therefore, it would be appreciated by those skilled in the art that changes may be made in these embodiments without departing from the principles and spirit of the invention, the scope of which is defined in the claims and their equivalents.

Figure 3:
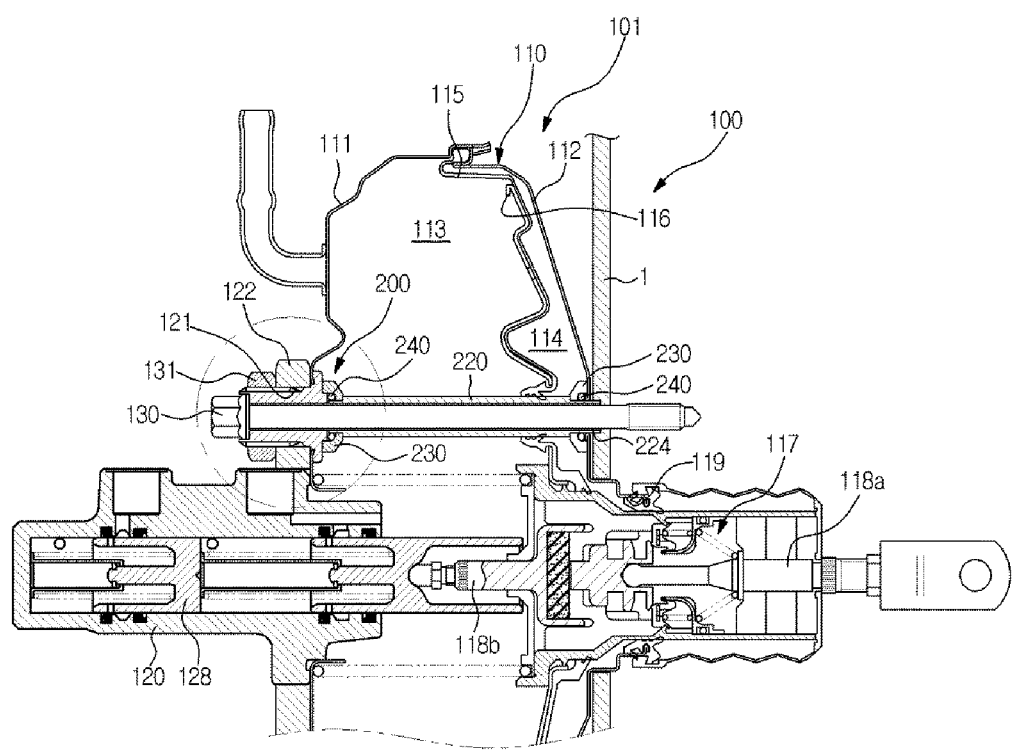
FIG. 3 is a cross-sectional view schematically illustrating a booster assembly for vehicles in accordance with one embodiment of the present invention.

FIG. 3 is a cross-sectional view schematically illustrating a booster assembly for vehicles in accordance with one embodiment of the present invention.

With reference to FIG. 3, a booster assembly 100 for vehicles a booster 101 generating large force at small force using a pressure difference between a vacuum and atmospheric pressure, a master cylinder 120 installed on the booster 101 and converting the force generated from the booster 101 into hydraulic pressure, a through bolt 130 mounting the booster 101 and the master cylinder 120 in a vehicle, and a mounting structure 200 for boosters crossing the booster 101 such that the through bolt 130 is inserted into the mounting structure 200 for boosters.

Here, the booster 101 and the master cylinder 120 are disposed in an engine room divided from a driver's seat by a dashboard 1, and are mounted on the dashboard 1 via the through bolt 130. Here, the through bolt 130 passes through the master cylinder 120 and the booster 101, and the end of the through bolt 130 is fastened to a fixing nut 4 (with reference to FIG. 1) of a pedal bracket 3 (with reference to FIG. 1) installed on the dashboard 1 at the side of the driver's seat. A structure of mounting the booster 101 and the master cylinder 120 via the through bolt 130 is the same as the above-described conventional structure of the booster assembly (with reference to FIG. 1), and a detailed description thereof will thus be omitted.

The booster 101 includes a casing 110 formed by hermetically connecting a front cell 111 and a rear cell 112, a diaphragm 115 installed within the hermetically sealed casing 110 to divide the inner space of the casing 110 into a static pressure chamber 113 and a variable pressure chamber 114, and a power piston 116.

An opening 119 is formed at the center of the rear surface of the casing 110, and a valve device 117 communicating the static pressure chamber 113 and the variable pressure chamber 114 with each other or communicating the variable pressure chamber 114 with the atmosphere while moving forwards and backwards by operation of an input shaft 118a connected to a brake pedal (not shown) so as to generate a pressure difference between the static pressure chamber 113 and the variable pressure chamber 114. Here, the pressure difference due to the operation of the input shaft 118a is transmitted to an output shaft 118b, and the output shaft 118b pushes a piston 128 of the master cylinder 120 fixed to the outer surface of the front portion of the front cell 111 to generate braking force.

The master cylinder 120 has a cylindrical shape provided with one end which is closed and the other end which is opened, and receives force transmitted through the output shaft 118b to generate hydraulic pressure. Such a master cylinder 120 is well known in the art, and a detailed description thereof will thus be omitted.

A flange part 122 to fasten the master cylinder 120 to the booster 101 is formed on the master cylinder 120. A hole 121 through which a front bolt 210 provided on the mounting structure 200 for boosters, which will be described later, passes is formed on the flange part 122.

In accordance with the embodiment of the present invention, the mounting structure 200 for boosters includes the front bolt 210 passing through the front cell 111, a tube 220 having a cylindrical shape, the inside of which is hollow in the lengthwise direction, and crossing the casing 110, a support washer 230 installed on the tube 220 to surround the rear portion of the front bolt 210, and a sealing member 240 provided between the tube 220 and the support washer 230.

The front bolt 210 is fixed to the front cell 111, and serves to support the through bolt 130 and to support the flange part 122 of the master cylinder 120. Such a front bolt 210 has a shape, the inside of which is hollow. In more detail, with reference to FIG. 4, the front bolt 210 includes a first connection part 211 protruding to the outside of the front cell 111, a second connection part 212 protruding to the inside of the front cell 111, and an extension part 213 integrally formed between the first connection part 211 and the second connection part 212.

Figure 4:
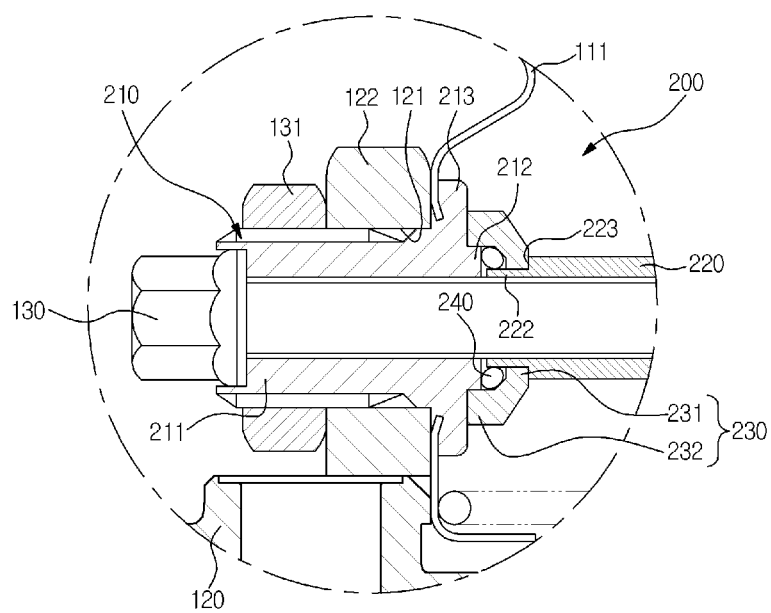
FIG. 4 is a partially enlarged view illustrating an essential portion of a mounting structure for boosters in accordance with one embodiment of the present invention.

The extension part 213 expands outwardly in the radial direction of the connection parts 211 and 212, as shown in FIG. 4, and is caulked and fixed to the front cell 111.

The first connection part 211 protrudes outwardly from the front portion of the front cell 111, and a screw thread is formed on the outer circumferential surface of the first connection part 211 so as to achieve screw connection of the first connection part 211 with a nut 131. That is, the master cylinder 120 may be fixed to the booster 101 by inserting the flange part 122 of the master cylinder 120 into the first connection part 211 through the hole 121 and then screw-connecting the nut 131 to the screw thread on the outer circumferential surface of the first connection part 211. Further, a head part of the through bolt 130 is closely attached to the front end surface of the first connection part 211 if the through bolt 130 is connected to the fixing nut 4 (with reference to FIG. 1).

The second connection part 212 protrudes from the rear portion of the front cell 11 and is connected to the support washer 230, and a connection structure of the second connection part 212 to the support washer 230 will be described later.

The tube 220 has a designated length and is disposed within the casing 110. The hollow formed in the tub 220 is provided to accommodate the through bolt 130, and is disposed to communicate with the hollow of the front bolt 210 in a straight line. Thereby, a front part 222 of the tube 220 is opposite the second connection part 212 of the front bolt 210, and a rear part 224 of the tube 220 passes through the rear cell 112. A stepped part 223 having a smaller outer diameter than that of the tube 220 is formed at each of both parts 222 and 224 of the tube 220. The stepped parts 223 formed at the parts 222 and 224 allow the tube 220 to be closely connected to the casing 110 to prevent the support washer 230 from being separated from the tube 220 when the tub 220 is installed on the front bolt 210 using the support washer 230.

The support washer 230 is installed on the tube 220, as described above, and is connected to the second connection part 212 of the front bolt 210. Such a support washer 230 has a dish shape provided with a through hole at the center thereof such that the stepped front part 222 of the tube 220 is inserted into the through hole. That is, the support washer 230 includes a rear support part 231 into which the stepped part 223 is inserted, and a front support part 232 extending from the rear support part 231 and connected to the second connection part 212 to surround the second connection part 212. Here, the front support part 232 may be press fitted to the second connection part 212. Therefore, the front support part 232 of the support washer 230 is connected to the second connection part 212 so that the front end surface of the front support part 232 is in surface contact with the extension part 213, and the front end surface of the rear support part 231 is closely attached to the stepped surface of the tube 220, thus maintaining a firm connection state.

In order to maintain airthightness between the tube 220 and the front bolt 210, the sealing member 240 is provided. The sealing member 240 may be an O-ring, and is provided between the tube 220 and the support washer 230.

Further, the stepped part 223 is formed at the rear part 224 of the tube 220 passing through the rear cell 112 in the same manner as the above-described front part 222 of the tube 220, and a sealing member 240 and a support washer 230 are installed on the stepped part 223 to achieve firm connection state with the rear cell 112. Those skilled in the art may sufficiently understand a connection structure of the rear part 224 of the tube 220 to the rear cell 112 from the connection structure of the front part 222 of the tub 220 to the support washer 230, and a detailed description thereof will thus be omitted.

As described above, the tube 220 is simply and firmly connected to the front bolt 210 through the support washer 230 and the sealing member 240, and thus the mounting structure 200 for boosters in accordance with the embodiment of the present invention may solve problems caused by inconvenience of the caulking process, addition of a process and logistics transportation, which are conventionally issued.

Although this embodiment illustrates the tube 220 and the front bolt 210 of the mounting structure 200 for boosters as being connected by the support washer 230, the tube 220 may be directly connected to the front bolt 210.

Figure 5:
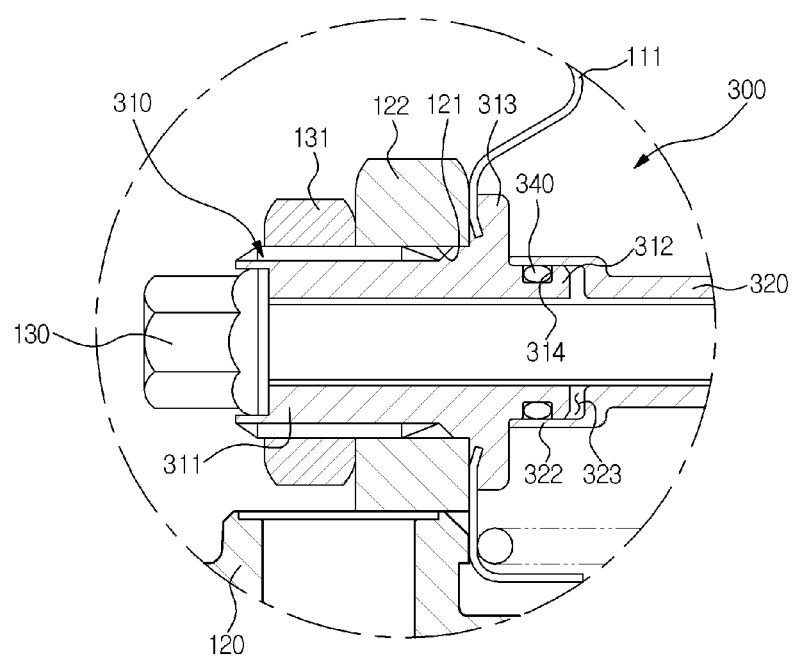
FIG. 5 is a partially enlarged view illustrating an essential portion of a mounting structure for boosters in accordance with another embodiment of the present invention.

Further, as shown in FIG. 5, a mounting structure 300 for boosters in accordance with another embodiment of the present invention includes a front bolt 310 installed on the front cell 111, a tube 320 connected to the front bolt 310, and a sealing member 340 provided between the tube 320 and the front bolt 310.

The front bolt 310 includes a first connection part 311 protruding to the outside of the front cell 111, a second connection part 312 protruding to the inside of the front cell 111, and an extension part 313 integrally formed between the first connection part 311 and the second connection part 312. The front bolt 310 has the same structure and executes the same function as those of the front bolt 210 in accordance with the former embodiment except for the second connection part 312. That is, a groove line 314 into which the sealing member 340, i.e., an O-ring, is inserted is formed on the outer circumferential surface of the second connection part 312.

A front part 322 of the tube 320 is provided with an expansion part 323 expanding so as to have a larger inner diameter than that of the tube 320, and is connected to the second connection part 312 of the front bolt 310 so as to surround the second connection part 312. That is, the front part 322 of the tube 320 is directly connected to the outer circumferential surface of the second connection part 312 of the front bolt 310 and the sealing member 340 is provided between the tube 320 and the front bolt 310, thereby obtaining ease of assembly and maintaining a firm connection state. Here, the front support part 332 of the tube 320 may be press fitted to the second connection part 312.

Although not shown in FIG. 5, a rear part (not shown) of the tube 320 may have the same structure as the rear part 224 of the tube 220 in accordance with the former embodiment.

Therefore, the mounting structure 300 for boosters in accordance with this embodiment may be installed on the booster 101 in the same manner as the mounting structure 200 for boosters in accordance with the former embodiment, and it is apparent that the mounting structure 300 for boosters in accordance with this embodiment may have the same structure and execute the same function as those of the mounting structure 200 for boosters in accordance with the former embodiment.

As is apparent from the above description, a mounting structure for boosters and a booster assembly for vehicles having the same in accordance with one embodiment of the present invention have effects, as follows.

First, a tube and a front cell are separately provided when a booster is manufactured or is installed on a vehicle body frame, and thus an additional process of caulking the tube in case of in-house manufacturing may be removed and logistics and transportation costs in case of outsourcing manufacturing may be reduced.

Second, an assembly process is simplified, and thus assembly costs may be reduced.

Third, the booster and a master cylinder are assembled in an engine room, thereby obtaining ease of assembly.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mounting structure for boosters to mount a booster provided with a casing formed by hermetically connecting a front cell and a rear cell, comprising:
    a front bolt passing through the front cell, the inside of the front bolt being hollow;
    a tube having a cylindrical shape, the inside of which is hollow in the lengthwise direction, and provided with a front part connected to the rear portion of the front bolt to surround the outer circumferential surface of the rear portion of the front bolt and a rear part crossing the casing to pass through the rear cell; and
    a sealing member provided between the tube and the front bolt.

2. The mounting structure for boosters according to claim 1, wherein the front bolt includes a first connection part protruding to the outside of the front cell, a second connection part protruding to the inside of the front cell, and an extension part integrally formed between the first connection part and the second connection part and expanding in the radial direction to be caulked to the front cell.

3. The mounting structure for boosters according to claim 1, wherein a groove line into which the sealing member is inserted is formed on the outer circumferential surface of the second connection part.

4. The mounting structure for boosters according to claim 1, wherein the tube is provided with an expansion part expanding so as to have a larger inner diameter than that of the tube, and the expansion part is connected to the second connection part so as to surround the second connection part.

5. A booster assembly for vehicles comprising:
    a booster provided within an engine room divided from a driver's seat by a dashboard;
    a master cylinder located at the outside of the front portion of the booster and converting force generated from the booster into hydraulic pressure;
    a pedal bracket connected to the dashboard at the side of the driver's seat and provided with a fixing nut formed integrally with the pedal bracket;
    a through bolt passing through the master cylinder and the booster from the engine room and fastened to the fixing nut of the pedal bracket; and
    a mounting structure for boosters crossing the booster such that the through bolt is inserted into the mounting structure for boosters, according to any one of claims 1 to 4.

6. The booster assembly for vehicles according to claim 5, wherein a flange part through which the front bolt provided on the mounting structure for boosters passes is formed on the master cylinder,
    further comprising a nut screw-connected to the front bolt passing through the flange part to fix the master cylinder to the booster.

* * * * *